United States Patent Office 3,823,069

Patented July 9, 1974

1

3,823,069
PREPARATION OF L(—)-γ-AMINO-α-HYDROXY-BUTYRIC ACID

Takeo Miyaki, Yokohama, and Kiyoshi Matsumoto, Tokyo, Japan, assignors to Bristol-Myers Company, New York, N.Y.

No Drawing. Filed Apr. 5, 1972, Ser. No. 241,427
Int. Cl. C12b *1/00*
U.S. Cl. 195—2 2 Claims

ABSTRACT OF THE DISCLOSURE

The specification discloses a microbiological process for the preparation of L(—)-γ-amino-α-hydroxybutyric acid from a racemic mixture of isomers.

BACKGROUND OF THE INVENTION

This invention relates to antibiotics and particularly to a derivative of the antibiotic known as kanamycin A and kanamycin B. The kanamycins are known antibiotics which are described in *Merck Index*, Eighth Edition, pp. 597 and 598.

One of the derivatives of the kanamycins having significant antibiotic properties is the 1-substituted derivative wherein the 1-amino function is acylated with a γ-amino-α-hydroxybutyryl moiety, preferably with L(—)-γ-amino-α-hydroxybutyric acid. These compounds have the following structure

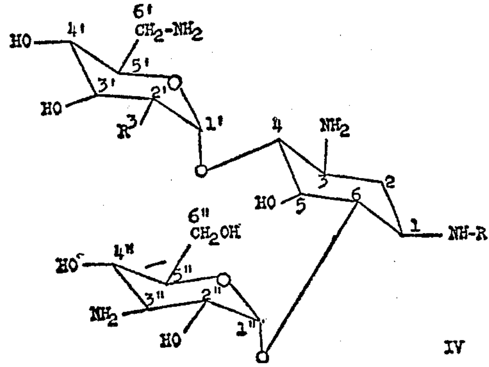

in which $R^3$ is OH or $NH_2$ and R is L-(—)-γ-amino-α-hydroxybutyryl, or a nontoxic, pharmaceutically acceptable acid addition salt thereof.

The term "nontoxic, pharmaceutically acceptable acid addition salt" as used herein means a mono-, di-, tri- or tetrasalt formed by the interaction of 1 molecule of compound with from 1 to 4 moles of a nontoxic, pharmaceutically acceptable acid. Included among these acids are acetic, hydrochloric, sulfuric, maleic, phosphoric, nitric, hydrobromic, ascorbic, malic and citric acid, and those other acids commonly used to make salts of amine-containing pharmaceuticals.

2

The compounds of the present invention can be prepared according to the following reaction scheme

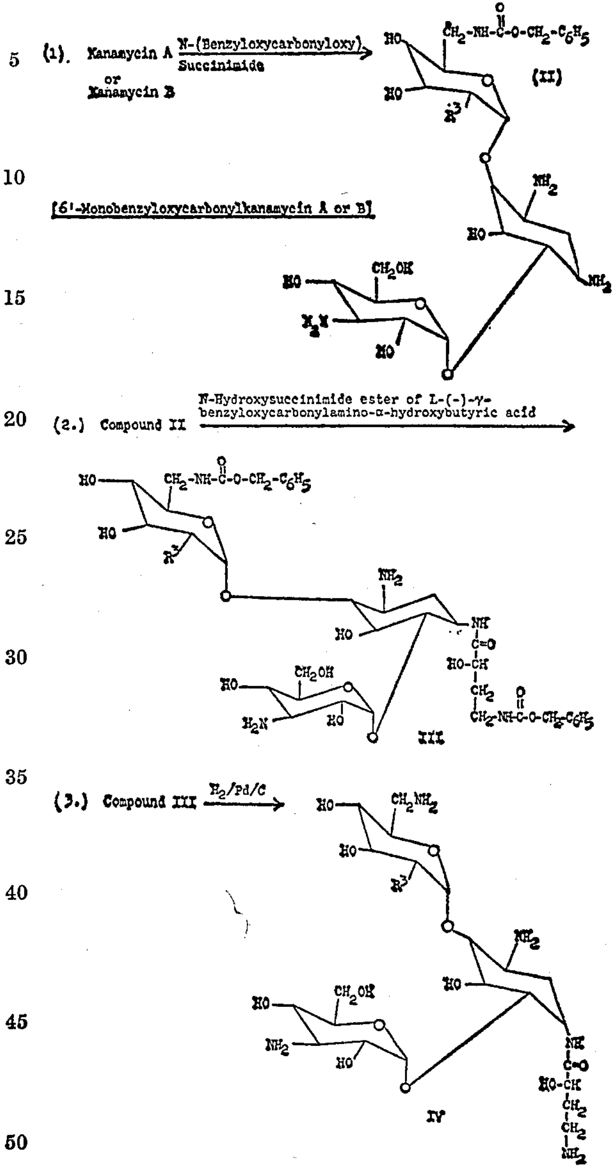

It will be appreciated that the preparation of L(—)-γ-benzyloxycarbonylamino-α-hydroxybutyric acid is an important step in the process for preparing the final compounds of formula IV and similarly that L(—)-α-amino-α-hydroxybutyric acid is an important intermediate in the overall synthesis of compound IV.

L(—)-γ-amino-α-hydroxybutyric acid is also found in the molecular structure of the antibiotic known as ambutyrosin which is disclosed in U.S. Pat. 3,541,078 and further discussed by Woo et al. in *Tetrahedron Letters*, No. 28, pp. 2617–2620, 1971.

The DL racemic mixture of γ-amino-α-hydroxybutyric acid can be prepared chemically by a method described by Saito et al., *Tetrahedron Letters, 1970*, 4863. The racemic mixture can also be resolved using dehydroabietylamine as the resolving agent.

It has now been found that the racemic mixture of D and L optical isomers of γ-amino-α-hydroxybutyric acid can be resolved by a microbiological process in which a strain of a microorganism of the family *Pseudomonadaceae* isolated from a soil sample collected at Hachijo-jima island is used to biologically assimilate or consume the D(+) isomer. The microorganism is a species of *Acetobacter* characterized as hereinafter described. A culture of this organism has been deposited in the American Type Culture Collection, 12301 Parklawn Drive, Rockville, Md. 20852, under number ATCC 21780. This organism has been found to be capable of metabolizing the D-isomer of γ-amino-α-hydroxybutyric acid as a source of carbon. Surprisingly, the organism does not utilize the L isomer as a source of carbon. Accordingly, the use of this organism in a suitable fermentation process provides an efficient and convenient means for resolving the chemically prepared racemic mixture of enantiomorphs.

The microorganism (ATCC 21780) was found to utilize D(+)-α-hydroxy-γ-aminobutyric acid (D-HABA) as a carbon source but not the levo-isomer.

Morphology of cells:

Pleomorphic, oval to oblong, bacillary. 0.4 to 0.7μ by 0.6 to 2.0μ. Cells occurring singly, in pairs and in short chain. Some bent or swollen at one end. No sporulation. Gram negative.

Growth:

| | |
|---|---|
| Nutrient agar | Opaque, butyrous, no pigment formed. |
| Colony on nutrient agar | Circular, smooth, flat to rather raised, pale-orange to colorless, 1–4 mm. (dia.). |
| Bouillon | Slightly turbid, viscous pellicle or sediment formed. Aerobic obligately. |
| Growth temperature on agar slant | Good growth (25–42° C.). Restricted growth (43–45° C.) No growth (>46° C.) |
| Pigment productions: | |
| King's medium A (for pyocyanin and pyorubin) | Negative. |
| King's medium B (for fluorescin and pyocyanin) | Do. |
| NaCl-broth | Good growth (0–3% NaCl). Restricted growth (4–5% NaCl). No growth (>6% NaCl). |
| Milk | Scant growth; not coagulated, not peptonized and pH unchanged. |

Physiological reactions:

| | |
|---|---|
| Gas formation from glucose | Negative. |
| pH of glucose broth | 7.0–7.5. |
| Voges-Proskauer reactions | Negative. |
| Starch hydrolysis | Do. |
| Indole | Do. |
| Nitrate reduction | Do. |
| Gelatin liquefaction | Not liquefied. |
| Oxidase (Kovacs) | Positive (strong). |
| Catalase | Positive (weak). |
| Oxidative/Fermentative reaction (Hugh and Leifson's method): | |
| From glucose | Oxidative. |
| From lactose | No acid. |
| Urease | Negative. |

Utilizes ammonium salts as a sole source of nitrogen.

Sugar utilization:

| | |
|---|---|
| Glycerin | + |
| L-Arabinose | − |
| D-Xylose | − |
| L-Rhamnose | − |
| D-Glucose | ++ |
| D-Galactose | − |
| D-Mannose | − |
| D-Fructose | ++ |
| D-Raffinose | − |
| Maltose | − |
| Sucrose | ++ |
| Lactose | − |
| Inositol | − |
| D-Mannitol | − |
| D-Sorbitol | − |
| Starch | − |

Special carbon source utilization:

| | |
|---|---|
| Ethanol | ++ |
| Propanol | ++ |
| Ethylamine | − |
| Diethylamine | − |
| Ethanolamine | ++ |
| Triethanolamine | + |
| Phenol | − |
| Cresol | ? |
| Alginate | − |
| Oxalate | − |
| Citrate | + |

Based on the above characteristics together, the microorganism seems to belong to Family *Pseudomonadaceae* in view of its cell morphology, gram-negative property and the physiological reactions, e.g., positive oxidase, oxidative, obligately aerobic and narrow sugar utilization pattern. It is, however, different from many species of Genus *Pseudomonas* in the lack of pigment-producing property. Rapid utilization of alcohols (ethanol and propanol) is a characteristic property of Genus *Acetobacter* and Genus *Protaminobacter,* but the latter should be excluded, because the microorganism does not utilize alkylamines. Therefore, it is most likely to belong to or to be most closely related to Genus *Acetobacter.*

As an illustrative procedure, an aqueous liquid synthetic fermentation medium comprising only inorganic salts, such as ammonium salts, e.g., ammonium sulfate, ammonium carbonate, ammonium chloride, sodium sulfate, magnesium sulfate, potassium hydrogen phosphate ($K_2HPO_4$), potassium dihydrogen phosphate ($KH_2PO_4$), and the racemic DL-γ-amino-α-hydroxybutyric acid is formulated with DL-γ-amino-α-hydroxybutyric acid as the sole source of carbon. After inoculation with the organism, the broth is incubated with agitation, until the D-isomer is substantially all metabolized. Incubation is convenient at a temperature ranging from about 25° C. to about 37° C.

The amount of D-isomer remaining in the broth as the fermentation progresses can be conveniently followed by means of dose-response data obtained by a paper disc-agar plate method using Friedlein's agar medium without a source of carbon and seeded with the organism (ATCC 21780). Friedlein's agar comprises 0.5% $NH_4Cl$, 0.5% $Na_2SO_4$, 0.01% $MgSO_4$, 0.1% $K_2HPO_4$, 0.1% $K_2HPO_4$, 0.1% $KH_2PO_4$ and 1.4% agar at a pH of 7.0.

After the plate is seeded with the organism, paper discs (13 mm.) saturated with broth are placed on the agar plate and incubated at 37° C. overnight. The growth zone surrounding the disc is read to determine the amount of D-isomer remaining in the broth.

Table I, below, shows a portion of typical dose-response data for standards as shown in column 1. D-HABA and L-HABA refer to the D(+) and L(−) forms of γ-amino-α-hydroxybutyric acid, respectively.

TABLE I

| Concentration, mg./ml. | Growth zone size (dia.), mm. | |
|---|---|---|
| | D-HABA | L-HABA |
| 10 | 32 | ---- |
| 5 | 28 | ---- |
| 2.5 | 26 | ---- |
| 1.25 | 24 | ---- |
| 0.63 | 20 | ---- |
| 0.31 | 17 | ---- |

At the point when all or substantially all of the dextro-isomer has been consumed, the fermentation is discontinued and the broth is harvested in the usual manner. The harvested broth is then centrifuged to remove the bacterial cells and the levo-isomer, in the supernatant can be absorbed on a strong cation exchange resin and then eluted with a dilute aqueous ammonia. Those fractions which show a positive ninhydrin test are collected and concentrated in vacuo. Upon addition of ethanol crystals of L(—)-γ-amino-α-hydroxybutyric acid form and are recovered by known techniques. The needlelike crystals recovered were compared with an authentic sample of the monohydrate L(—)-γ-amino-α-hydroxybutyric acid and found to be a substantially pure compound. The recovery of the above levo-isomer provides relatively high yields.

For larger scale fermentation operations, rapid and vigorous growth of the culture can be achieved in a nutritionally rich organic medium such as Heart Infusion Broth. The cells are then collected, washed in saline and used to inoculate the fermentation vessels. Although the fermentation period is relatively short, it can be reduced by increased amounts of inoculum.

A range of about 1 to about 3 percent of the racemic mixture of the γ-amino-α-hydroxybutyric acid is suitable for the fermentation.

The following examples illustrate the principles and practice of this invention.

Example 1

A 50-ml. Erlenmeyer flask containing 100 mg. of DL-γ-amino-α-hydroxybutyric acid in 10 ml. of medium having a composition of 0.5% $NH_4Cl$, 0.5% $Na_2SO_4$, 0.01% $MgSO_4$, 0.1% $K_2HPO_4$ and 0.1% $KH_2PO_4$ was sterilized in an autoclave, cooled, inoculated with a loopful of agar slant culture of strain ATCC 21780 and shaken at 28° C. for three days on a rotary shaker (250 r.p.m.). The fermented broth was centrifuged to separate the bacterial cells and the supernatant was applied on a column containing 5 ml. of Amberlite IR–120 ($H^+$ form). The column was washed by water and then eluted with 1N $NH_4OH$. The ninhydrin-positive fractions were collected, concentrated *in vacuo* to a small volume and then added with ethanol to induce precipitation. The precipitate was collected and dried to give 15.3 mg. of yellowish white solid which was identified with L(—)-γ-amino-α-hydroxybutyric acid. $[\alpha]_D^{25}=-24°$ (*c* 1.0, $H_2O$).

Example 2

Similar to but larger scale preparation than in Example 1 was carried out using 10 grams of DL-γ-amino-α-hydroxybutyric acid in 1L of medium having the same composition as in Example 1. Ten 500-ml. Erlenmeyer flasks each containing 100 ml. of the medium were inoculated with a portion of agar slant culture of strain ATCC 21780 and shake-cultured at 28° C. for three days. The harvested broth (pH 9.4) was centrifuged, the clear supernatant was adjusted to pH 7.0 by conc. HCl and applied on a column of Amberlite IR–120 (500 ml. $H^+$ form). The column was washed with 2 l. of water and then eluted with 1N $NH_4OH$ solution collecting 20-ml. fractions. The ninhydrin-positive fractions (Nos. 71 through 94) were combined, concentrated *in vacuo* to 150 ml., neutralized by Amberlite IRC–50 ($H^+$ form), treated with a small amount of active charcoal for decolorization and filtered. The filtrate was concentrated *in vacuo* to 15 ml., added with 40 ml. of ethanol and kept standing overnight in the cold. Colorless needle-like crystals, weighing 4.402 g. and $[\alpha]_D^{34}=-29°$ (*c* 1.0, $H_2O$), were obtained, which were identified by IR spectrum with the hydrate form of L(—)-γ-amino-α-hydroxybutyric acid. The hydrate crystals were dried overnight in the presence of $P_2O_5$ to give 4.07 g. of the anhydrous crystals, the overall yield being 81.4%.

Example 3

A 500-ml. Erlenmeyer flask containing 100 ml. of the Heart Infusion Broth (Difco) was inoculated with a loopful of agar slant culture of strain ATCC 21780 and shake-cultured at 28° C. for 18 hours. The cells were collected by centrifugation, washed with saline solution and re-suspended in 10 ml. of saline. A 0.1 ml.-portion of this cell suspension, which was found to contain about $10^{10}$ viable cells, was used to inoculate 100 ml. of the medium having the same composition as in Example 2. Vigorous bacterial growth was observed after 26 hours when substantially most of the dextro-isomer of the hydroxyamino acid was found to have been consumed.

Example 4

A 500-ml. Erlenmeyer flask containing 1 g. of DL-γ-amino-α-hydroxybutyric acid in 100 ml. of medium having a composition of 1% $(NH_4)_2SO_4$, 0.5% $Na_2SO_4$, 0.01% $MgSO_4$, 0.1% $K_2HPO_4$ and 0.1% $KH_2PO_4$ was inoculated with 1 ml. of a seed culture of ATCC 21780 which had been pre-incubated in Heart Infusion Broth (Difco) for two days at 37° C. The fermentation flask was shaken for two days at 37° C. on a rotary shaker. The harvested broth was filtered, adsorbed by 50 ml. of Amberlite IR–120 ($H^+$ form) and then treated by the same procedure as in Example 1 to give 427 mg. (85.4%) of L(—)-γ-amino-α-hydroxybutyric acid. $[\alpha]_D^{25}=-24.5°$ (*c* 2.0, $H_2O$).

Example 5

A 500-ml. Erlenmeyer flask containing 1 g. of DL-γ-amino-α-hydroxybutyric acid in 100 ml. of medium having a composition of 1% $(NH_4)_2CO_3$, 0.5% $Na_2SO_4$, 0.01% $MgSO_4$, 0.1% $K_2HPO_4$ and 0.1% $KH_2PO_4$ was fermented and then treated by the same procedure as in Example 4 to give 316 mg. (63.2%) of L(—)-γ-amino-α-hydroxybutyric acid. $[\alpha]_D^{25}=-27.5°$ (*c* 2.0, $H_2O$).

The term synthetic fermentation medium, as used herein is intended to define a medium free from natural products utilized as nutrients as a source of carbon or nitrogen.

What is claimed is:

1. A process for producing substantially pure L(—)-γ-amino-α-hydroxybutyric acid from DL-γ-amino-α-hydroxybutyric acid which comprises cultivating under aerobic conditions Acetobacter species ATCC 21780 in a synthetic aqueous medium containing DL-γ-amino-α-hydroxybutyric acid as the sole source of carbon until essentially all D(+)-γ-amino-α-hydroxybutyric acid has been metabolized and recovering substantially pure L(—)-γ-amino-α-hydroxybutyric acid.

2. The process of claim 1, wherein said medium consists essentially of DL-γ-amino-α-hydroxybutyric acid in amounts of about 1 to about 3 weight percent and inorganic salts of the group consisting of ammonium salts, sodium sulfate, magnesium sulfate, dipotassium hydrogen phosphate and potassium dihydrogen phosphate.

References Cited

Saito et al.; *Tetrahedron Letters;* No. 56, pp. 4863–4866; 1970; Pergamon Press.

A. LOUIS MONACELL, Primary Examiner

R. J. WARDEN, Assistant Examiner

U.S. Cl. X.R.

195—29, 30